UNITED STATES PATENT OFFICE.

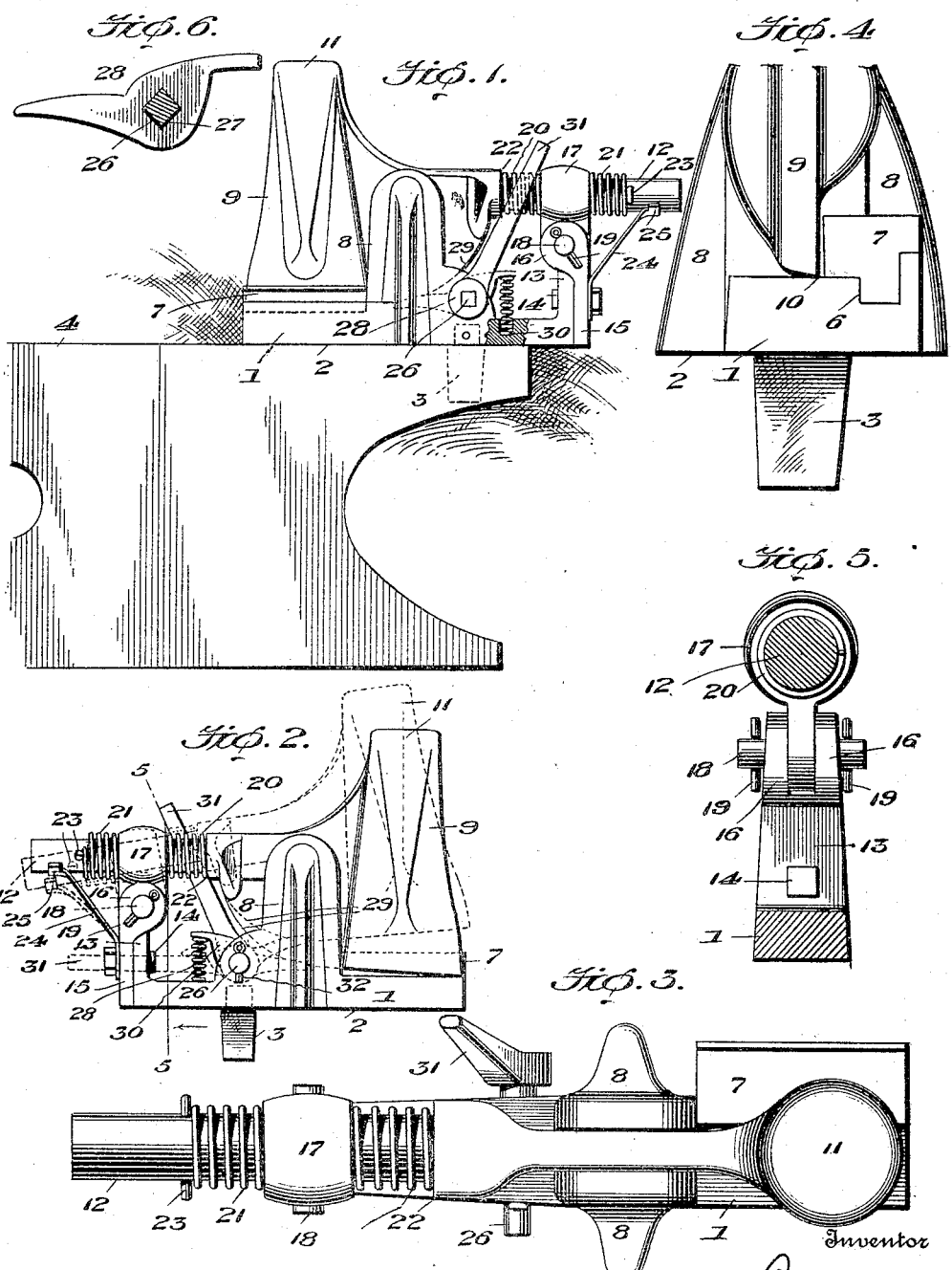

NELSON W. LARMORE, OF MECHANICSVILLE, NEW YORK.

METAL CUTTER OR SHEARS.

1,205,755.            Specification of Letters Patent.        Patented Nov. 21, 1916.

Application filed February 26, 1916. Serial No. 80,620.

*To all whom it may concern:*

Be it known that I, NELSON W. LARMORE, a citizen of the United States, residing at Mechanicsville, county of Saratoga, and State of New York, have invented certain new and useful Improvements in Metal Cutters or Shears, of which the following is a specification.

This invention relates to metal cutters or shears.

My object is to provide metal cutters or shears, particularly such as are used on anvils, having improvements whereby the metal is so held that rebounding of the movable shear or cutter when a blow is struck, is prevented, without requiring the use of a helper; the movable shear or cutter held firmly on the metal to be cut; the shock of the blow taken off of the connection between the movable shear and its base; wear on the base minimized; adaptability for holding the device to any anvil; and retraction of the movable shear rendered easy.

With these, and other, not specifically mentioned objects in view, my improvements consist, first, in novel mounting and actuating and cushioning means for the movable shear; removability of the cutting die for the base; improved means for elevating or releasing the movable cutting shear; a detachable shank for holding the device on the anvil; and other features and combinations of parts set forth more fully hereinafter.

The embodiment of the invention hereinafter set forth and which is disclosed in the accompanying drawings is to be considered as illustrative, rather than restrictive of the scope of the invention, as modifications may be resorted to without changing the principle of the device.

In the accompanying drawings: Figure 1 is a view showing the shears applied to an anvil; Fig. 2 a side elevation, dotted lines showing how the movable shear may be raised; Fig. 3, an enlarged plan view; Fig. 4, an enlarged detail view showing the movable die broken at the top; Fig. 5, a vertical section on line 5—5, Fig. 2; and Fig. 6, an enlarged detail of the elevating device.

The base 1 is flat on its bottom 2 and has a detachable square shank 3 adapted to fit in the usual square hole in the anvil 4, and held in a square socket in the base by a removable pin. The removability of the shank permits any desired size of shank to be used to fit any size hole in the anvil on which the device is placed. The base has a longitudinally extending slot 6 to receive a removable cutter or die 7. Wear on the base is thus minimized, as another die can be used when the die becomes worn, or, the die removed and re-sharpened. Furthermore, the die being adjustable lengthwise of the base, different portions of the upper face thereof may be used at different times, with resulting evenness of wear. Ears or guides 8 rise from the base, and constitute guide members for the cutter or shear 9 which has a sharpened edge 10 and whose lower edge is beveled to cause proper coöperation with the die 7. The cutter or shear 9 is provided with a striking head 11 and it has a rearwardly extending cylindrical stem 12.

Detachably connected to the upright portion 13 of the base by bolt 14, is a removable standard 15 having ears 16. A rocker-eye 17 serves as a support and bearing for the stem 12 which is adapted to slide therethrough to a limited extent, the rocker-eye having its lower portion received between the ears 16 and pivoted to the standard 15 by a pin 18 which is held by cotters 19 which, being readily removable, permit detachment of the shear 9 and rocker-eye 17 whenever this is necessary or desirable. Coil springs 20 and 21 surround the stem 12 on opposite sides of the rocker-eye 17, one of said springs bearing against a shoulder 22 on the shear and the other against a removable cotter 23, which extends diametrically through the stem 12. The springs 20 and 21 are under compression and constitute a shock absorbing device to relieve the pivot pin 18 from the shock of blows delivered to the shear 9, whichever direction such blows may tend to move said shear lengthwise of the base.

A leaf spring 24 which is held by the bolt 14, bears against the lower side of the rear end of the stem 12, thus holding the cutting edge of the shear 9 normally downwardly and returning it to this position whenever it is released after having been raised. This spring causes the cutting edge of the shear 9 to bear upon the metal which is to be cut and at the time is resting upon the die 7. The services of a helper are thus rendered unnecessary as the shear holds the metal and enables the smith to employ both hands in delivering the blow on the shear 9. Preferably, the upper end of the spring 24 is provided with a transversely curved seat 25 to afford a proper bearing on the stem 12 and yet not interfere with the sliding movement thereof.

Extending through rearward extensions of the ears 8 and journaled therein is a rock shaft 26 which has a square portion 27 removably passing through a cam or wiper 28 which is adapted to bear upon the curved part 29 of the shear 9 between the guides 8 and which is normally urged downwardly by a coil spring 30. Secured to the shaft 26 is a handle 31. A cotter 32 prevents the shaft from becoming detached, but permits detachment whenever necessary. When it is desired to cut off a piece of metal, the handle 31 is depressed, whereupon the shear 9 is elevated. The metal is then introduced between the die and the cutting edge of the shear and the handle released, whereupon the tension of the leaf spring 24 holds the shear 9 firmly on the metal. The smith may then strike the requisite blows to sever the metal. The shock of the blows, instead of being taken directly by the pivot pin 18, is cushioned by the coil springs 20 and 21. The die 7 may be moved lengthwise of the base from time to time so as to distribute the wear thereon. Either hot or cold metal can be cut by my shears.

Having thus described my invention, what I claim as new and desire to secure by Letters Patent, is:—

1. In metal cutters or shears, the combination with a base having a cutter or shear member, of a free cutter or shear member adapted to coöperate therewith mounted for both up and down and lengthwise movement in relation to said first-named cutter or shear member when being operated, said free cutter having a striking head or portion adapted to receive the blows of a hammer or sledge, and means for cushioning the lengthwise movement of said free cutter.

2. In metal cutters or shears, the combination with a base having a cutter or shear member, of a normally closed free cutter or shear member adapted to coöperate therewith mounted for both up and down and lengthwise movement in relation to said first-named cutter or shear member when being operated, said free cutter having a striking head or portion adapted to receive the blows of a hammer or sledge, means for cushioning the lengthwise movement of said free cutter, and means for raising the movably mounted cutter or shear member to open the shears.

3. In metal cutters or shears, the combination with a base having a cutter or shear member, of a cutter or shear member adapted to coöperate with the first-named shear member and movably mounted for both up and down and lengthwise movement in relation thereto, spring means for closing the movable shear member, and means for cushioning the lengthwise movement of the movable shear member.

4. In metal cutters or shears, the combination with a base having a cutter or shear member, of a movably mounted cutter or shear member adapted to coöperate with the first-named shear member, a combined pivotal and slidable connection between the movable shear member and the base, and means for cushioning the sliding movement of the movable shear or cutter.

5. In metal cutters or shears, the combination with a base having a cutter or shear member, of a movably mounted cutter or shear member adapted to coöperate with the first-named shear member, a combined pivotal and slidable connection between the movable shear member and the base, and spring means for urging the movable cutter or shear toward the shear on the base.

6. In metal cutters or shears, the combination with a base having a cutter or shear member, of a movably mounted cutter or shear member adapted to coöperate with the first-named shear member, a combined pivotal and slidable connection between the movable shear member and the base, spring means for urging the movable cutter toward the cutter on the base, and a spring cushion for the lengthwise movement of the said cutter or shear.

7. In metal cutters or shears, the combination with a base having a cutter or shear member, of a rocker pivoted to said base, a movable shear member having a stem slidably connected to the rocker, and a spring cushion for the said slidable stem of said movable shear member.

8. In metal cutters or shears, the combination with a base having a cutter or shear member, of a rocker pivoted to said base, a movable shear member having a stem slidably connected to the rocker, means for cushioning the movement of the movable cutter in both directions in respect to said rocker.

9. In metal cutters or shears, the combination with a base having a cutter or shear member, of a rocker pivoted to said base, a movable shear member having a stem slidably connected to the rocker, and coil springs surrounding said stem on opposite sides of the rocker and coöperating with the rocker and with the stem to cushion the movement of the movable shear in both directions.

10. In metal cutters or shears, the combination with a base having a cutter or shear member, of a movably mounted cutter or shear member, a rocker-eye pivoted to the base, said movable shear member having a stem slidable through the rocker-eye, coil springs surrounding said stem and coöperating with it and with opposite sides of the rocker-eye, and a spring coöperating with the stem to urge the movable cutter toward the cutter on the base.

11. In metal cutters or shears, the combination with a base having a cutter or shear member, of a movable cutter or shear member having a stem, a rocker pivoted to the base and in which the stem is movably mounted, and a spring coöperating with said stem to urge the movable cutter toward the cutter on the base.

12. In metal cutters or shears, the combination with a base having a cutter or shear member, of a free, normally closed movable cutter or shear member mounted for both up and down and lengthwise shifting in relation to the aforesaid cutter or shear member when being operated, a cam for opening said movable cutter arranged to permit both movements of said cutter when said cutter is operated and means for shifting said cam, said free cutter having a striking head or portion adapted to receive the blows of a hammer or sledge.

In testimony whereof, I hereunto affix my signature.

NELSON W. LARMORE.

Copies of this patent may be obtained for five cents each, by addressing the "Commissioner of Patents, Washington, D C."